United States Patent [19]

Heymanns et al.

[11] 4,358,122

[45] Nov. 9, 1982

[54] APPARATUS FOR POWER CLAMPING WORK PIECES

[75] Inventors: Lothar Heymanns; Heinz vom Dorp, both of Monchen-Gladbach, Fed. Rep. of Germany

[73] Assignee: Wilhelm Hegenscheidt Gesellschaft mbH, Erkelenz, Fed. Rep. of Germany

[21] Appl. No.: 189,301

[22] Filed: Sep. 22, 1980

Related U.S. Application Data

[62] Division of Ser. No. 51,350, Jun. 25, 1979, Pat. No. 4,138,293.

[30] Foreign Application Priority Data

Jul. 3, 1978 [DE] Fed. Rep. of Germany ....... 2829152

[51] Int. Cl.³ .................... B23B 5/34; B23B 31/10; B23B 31/40
[52] U.S. Cl. .................................. 279/2 A; 82/8; 82/44; 279/4; 279/106; 279/123
[58] Field of Search ............ 279/2 R, 2 A, 4 R, 123, 279/106; 82/4 E, 8, 40 R, 44

[56] References Cited

U.S. PATENT DOCUMENTS

| 1,131,696 | 3/1915 | Hess ..................... 279/106 |
| 2,473,935 | 6/1949 | Ashton ................... 279/123 |
| 2,832,604 | 4/1958 | LeBrusque ............ 279/106 X |
| 3,044,791 | 7/1962 | Nicosia et al. ........ 279/106 |
| 3,952,384 | 4/1976 | Goldry et al. ........ 279/106 X |

Primary Examiner—Z. R. Bilinsky
Attorney, Agent, or Firm—W. G. Fasse; D. F. Gould

[57] ABSTRACT

According to the present apparatus work pieces such as railroad wheels are power clamped on a cone shaped inwardly facing side. In a first clamping step clamping areas are impressed into the side or surface of the work piece said clamping areas having a suitable inclination. In a second clamping step the actual power clamping is performed at these clamping areas. For this purpose a plurality of radially moving clamping jaws are arranged to carry at least one clamping tooth. Each clamping tooth in turn is adjustable in its position in an axial direction along its respective radially moveable clamping jaw.

4 Claims, 11 Drawing Figures

APPARATUS FOR POWER CLAMPING WORK PIECES

CROSS-REFERENCE TO RELATED APPLICATION

The present application is a Divisional Application of U.S. Ser. No.: 051,350, filed on June 25, 1979 now U.S. Pat. No. 4,138,293.

BACKGROUND OF THE INVENTION

The present invention relates to an apparatus for power clamping work pieces at cone shaped surfaces by means of a power clamping vice. More specifically the invention aims to clamping railroad wheels by radially moveable clamping jaws, which engage the cone shaped inner side of a wheel rim. The invention also relates to a power clamping vice for the just mentioned purpose.

Power clamping vices for performing different kinds of clamping operations are known in the art in a multitude of versions. Particularly in connection with vertical turning or milling machines the power clamping vice is frequently constructed in the form of a so-called face plate. This type of structure is particularly used in vertical turning or milling machines preferably designed for machining of railroad wheels. Such power clamping vices are known in many different versions. A particularly good summary or review of the relevant prior art relating to power clamping vices for vertical milling or turning machines particularly for the milling of railroad wheels may be found in the article entitled "Power Operated Clamping Devices for Railroad Wheels and Wheel Rims" published in "TZ for Practical Metal Working" (Kraftbetaetigte Spanneinrichtungen fuer Eisenbahnraeder und Radreifen) 1974, Number 9, starting at page 315.

Especially, if a railroad wheel must be clampd on the radially inwardly facing side of its rim for a milling operation and if this inwardly facing rim side has a conical shape, as is very frequently the case, difficulties have been caused in the clamping due to this conical surface. The railroad wheel has a tendency to slip with the conical inner surface off the clamping teeth of all or of individual clamping jaws during the clamping operation, whereby the wheels slides upwardly even before the clamping teeth have been able to penetrate far enough into the material of the wheel and a further upward sliding cannot be prevented. Due to this slipping and sliding the work piece is not any more supported in a plane and its position relative to reference points is unknown, whereby the automatic control of the milling tools for the subsequent milling operation is substantially prevented.

Efforts have been made to solve this problem by means of a clamping vice as shown in FIG. 10 of the above mentioned article and the respective description. The described construction includes clamping jaws with rigidly arranged teeth.

The clamping jaws are moveable on radially arranged and downwardly inclined guide tracks. The downward inclination is intended to make sure, that the clamping teeth pull the work piece simultaneously downwardly against the face plate or rather the power clamping vice when the teeth penetrate into the material of the work piece. However, practical experience has shown that the success hoped for did not materialize. This lack of success seems to be due to the fact that the amount of upward gliding of the work piece and the amount of downward movement of the clamping teeth carried by the clamping jaws cannot be adjusted or adapted to each other, particularly since the amount of downward movement depends on the inclination of the guide surface. While all clamping teeth are moved downwardly by the same distance which depends on the extend of penetration of the teeth into the work piece, the latter slides upwardly on each tooth by a different amount. This situation is aggrevated by the fact that none of the individual sliding-up distances necessarily corresponds in its size to the magnitude of downward movement of a clamping tooth or of the clamping teeth. Thus, the mentioned problem cannot be solved by the prior art power clamping vice.

OBJECTS OF THE INVENTION

In view of the above, it is the aim of the invention to achieve the following objects, singly or in combination:

to suggest a clamping device which makes it possible to clamp railroad wheels at their conically extending inwardly facing rim surfaces so as to keep the wheels in a correct position for a machining operation and;

to construct a power clamping vice in such a manner, that the teeth thereof will first penetrate into the work piece and then after such penetration be moved into a clamping position.

SUMMARY OF THE INVENTION

According to the invention the present clamping operates in such a manner that in a first step clamping ares or surfaces are impressed into the work piece whereby these clamping areas or surfaces have an inclination which is suitable for the subsequent clamping operation which is then performed after the impressing in order to clamp the work piece at these clamping areas or surfaces.

The penetration into the work piece and formation of the clamping surfaces is performed by the same teeth which are subsequently used for the clamping operation.

The power clamping vice according to the invention for performing the above method comprises several radially moveable clamping jaws each of which carries at least one clamping tooth suitable for the clamping and entraining of the work piece. Each of these clamping teeth is arranged on its carrying radially moveable clamping jaw in a manner so that each tooth is axially adjustable in its position.

Preferably, each clamping tooth is arranged on a toggle type of lever which in turn is arranged on the radially moveable clamping jaw. In this embodiment one side of the toggle type lever is arranged for co-operation with the piston rod of a fluid operated plunger or piston and the other side or end of the toggle type lever is arranged for co-operation with a spring loaded bolt.

According to another embodiment of the invention each clamping tooth is directly arranged on the piston rod which in turn is constructed as a clamping tooth carrier. The piston rod is axially displaceable in or on a fluid cylinder arranged on the respective radially moveable clamping jaws.

BRIEF FIGURE DESCRIPTION

In order that the invention may be clearly understood, it will now be described by way of example, with reference to the accompanying drawings, wherein.

DETAILED DESCRIPTION OF PREFERRED EXAMPLE EMBODIMENTS AND OF THE BEST MODE OF THE INVENTION

Figure 1:
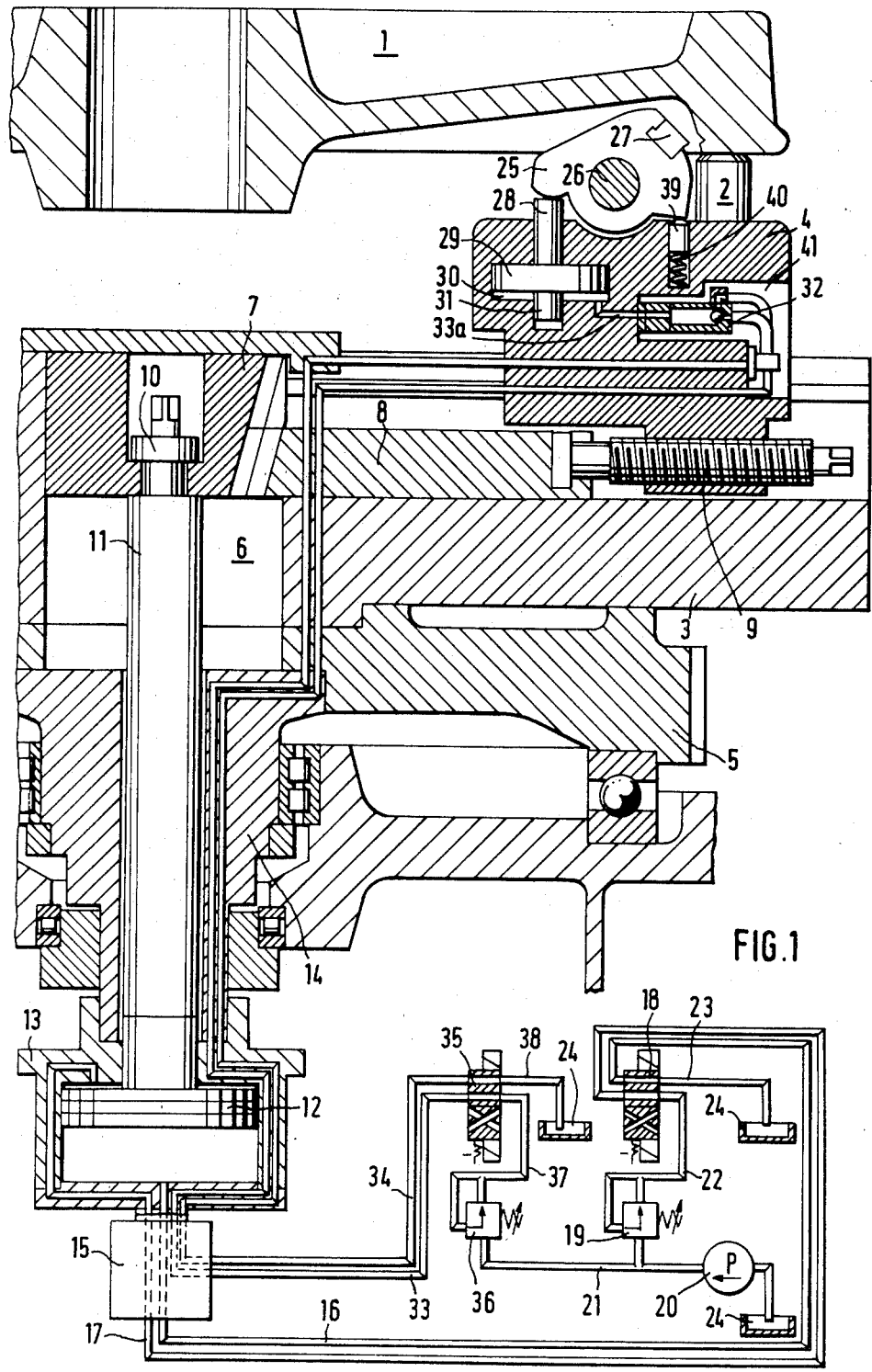
FIG. 1 is a longitudinal axial section through the main spindle of a vertical turning or milling machine comprising a power clamping vice wherein the work piece in the form of a railroad wheel has been placed in a position prior to clamping.

FIG. 1 shows the railroad wheel 1 supported on support bolts 2 which are arranged between the clamping jaws 4 of a power clamping vice 3 in a vertical turning or milling machine. The power clamping vice 3 is arranged on the so-called face plate 5 of the vertical milling machine. A sliding member 7 is supported for axial displacement in a concentric bore 6 of the power clamping vice 3. The sliding member 7 is operatively connected in a known and customary manner with a plunger 8 one of which is provided for each clamping job. The operative connection includes slanting guides for translating the axial movement of the sliding member 7 into a radial movement of the plunger 8. Each plunger 8 is connected with a clamping jaw 4 through an adjusting spindle 9 for the basic adjustment of the respective clamping jaw 4 relative to the desired diameter position of the clamping range. The sliding member 7 is connected with a pull rod 11 by means of a screw 10. The pull rod 11 is arranged coaxially to the main spindle 14 and is axially displaceable by means of a clamping cylinder 13 including a piston 12, whereby said sliding member 7 is also displaced. The clamping cylinder 13 is a pressure medium cylinder which in the illustrated example may be operated by a hydraulic pressure medium, for example oil.

The sliding member 7 must move downwardly as shown in FIG. 1 under the action of the pull rod 11 in order to move the clamping jaws 4 radially outwardly into the clamping position. Since the pull rod 11 is connected with the piston 12 of the clamping cylinder 13, the piston 12 in said cylinder 13 must also move downwardly. This is accomplished because the pump 20 supplies pressure medium through the conduit 21, through the pressure control valve 19 and through the conduit 22 to the path selector valve 18. In the shown example, the path selector valve 18 is a pulse operated valve which stays in or retains its switched position even if no current is supplied.

In the switched position shown in FIG. 1 pressure oil is continued to be supplied through the path selector valve 18 into the conduit 16 and through the rotary distributor 15 into the clamping cylinder 13. However, introduction of oil under pressure into the clamping cylinder 13 through the conduit 16 causes the lifting of the piston 12, whereby the clamping jaws 4 are moved radially inwardly. In order to accomplish a movement radially outwardly the path selector valve 18 must be switched into the second switched position. In this second switched position, oil under pressure is introduced into the conduit 17 whereby the piston 12 is moved downwardly and thus a radial outward movement of the clamping jaws 4 is accomplished. In this instance the pressure medium on the other side of the piston 12 is conducted through the conduit 16 and the path selector valve 18 and further through the conduit 23 into the container 24.

A cam or disk shaped toggle type lever 25 is arranged on each clamping jaw 4. The lever 25 is tiltable on a bearing bolt 26. The lever 25 has a clamping tooth 27 for clamping the work piece. Further, each clamping jaw 4 comprises a cylinder 30 in which a piston 29 is arranged for displacement. The piston 29 is guided by the two piston rods 28 and 31 whereby the piston rod 28 is operatively connected with the toggle type lever 25 in such a manner that a tilting movement of the lever 25 about the bearing bolt 26 may be accomplished by means of an upward movement of the piston 29 and thus of the piston rod 28. For this purpose, it is necessary that oil under pressure is supplied to the cylinder 30 through the conduits 33 and 33a. This oil under pressure is supplied by the pump 20 through the conduit 21 and through the pressure control valve 36, through the conduit 37 to the path selector valve 35. This selector valve 35 is connected to supply the oil under pressure into the conduit 33 as illustrated in the switched position shown in FIG. 1. Preferably the path selector valve 35 is also a pulse operated valve which retains its respective switched position when the power is turned off. The oil under pressure supplied to the cylinder 30 through the conduit 33 flows through the check valve 32 which may be opened and which is preferably arranged in the recess 41 of each clamping jaw 4. The openable or releasable check valve 32 is intended to prevent that the clamping force for the work piece is released when large external forces are effective on the work piece or if the hydraulic pressure fails.

Figure 2:
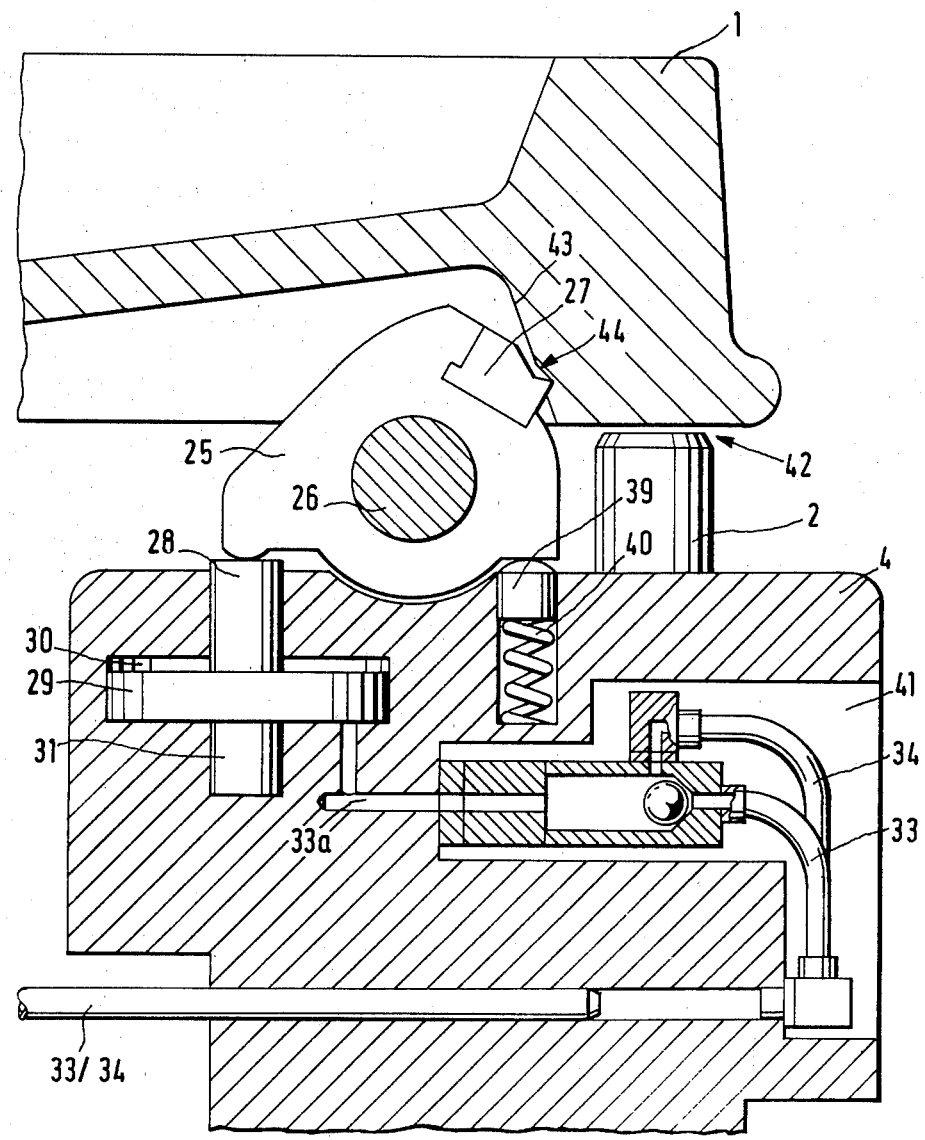
FIG. 2 illustrates on an enlarged scale the first step of the present method in which a clamping tooth is brought into a penetrating or impression position relative to the work piece.

It is necessary to bring the path selector valve 35 into its second switched position in order to undo the tilting movement that has been previously performed. Thus, oil under pressure flows into the conduit 34 whereby the check valve 32 is released or unlocked and thus the oil return flow through the conduits 33a and 33 as well as through the path valve 35 and the conduit 38 into the tank 24 is opened. Thus, the bolt 39 which is biased by the spring 40 is enabled to tilt the toggle or rocker lever 25 in the opposite direction, whereby the piston rod 28 and thus the piston 29 are moved downwardly. FIGS. 2, 3, 4 and 5 show in sequence the clamping method of the invention for clamping a railroad wheel on the inner, substantially inclined surface of the wheel rim. First, the railroad wheel 1 is placed onto the support bolts 2 as shown in FIG. 1. Then, the clamping jaws 4 are driven to move radially outwardly whereby the rocker or toggle lever 25 takes up a position as shown in FIG. 2. In this position the clamping teeth 27 engage the substantially inclined inner surface 43 of the wheel rim with a clamping contact, whereby the teeth 27 penetrate on the one hand into the material of the rim wheel. On the other hand the teeth 27 cause an upward sliding of the wheel 1 so that a gap 42 occurs between the support bolts 2 and the wheel 1. This upward sliding of the railroad wheel 1 during the clamping operation must positively be avoided because it prevents on the one hand the safe clamping of the wheel 1 in the milling machine and on the other hand it prevents the wheel from taking up a defined position in the milling machine so that numerically controlled milling operations cannot be performed any more.

Figure 3:
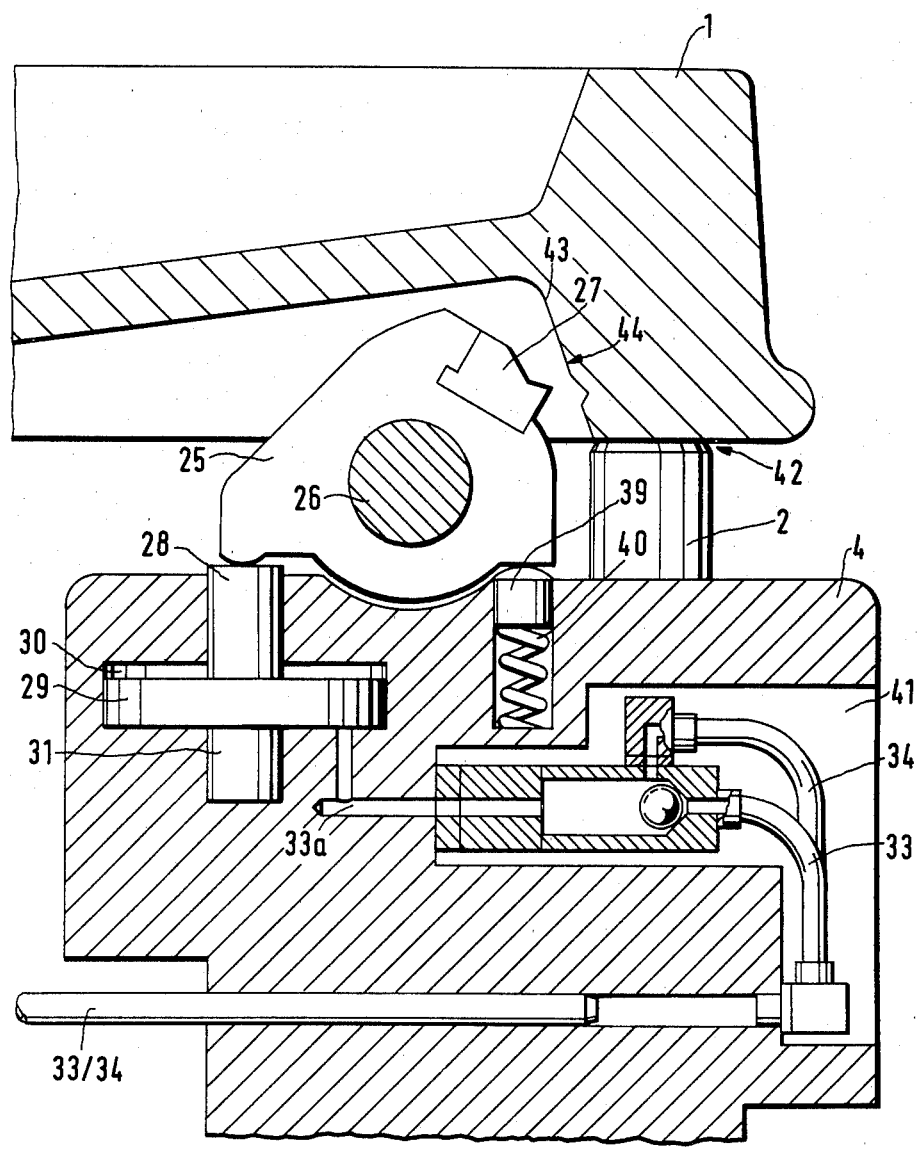
FIG. 3 illustrates a view similar to that of FIG. 2, however, showing an intermediate step in which the clamping tooth is disengaged from the work piece.

In order to avoid these disadvantages the initial, radially outwardly effective clamping as shown in FIG. 2 is released and the clamping jaws 4 are again moved radially inwardly as shown in FIG. 3. Thus, the wheel 1 rests again on the bolt 2 thereby takes up the desired, defined position relative to the vertical axis of the milling machine. The initial radially outwardly effective clamping results in the formation of clamping impressions 44 the shape of which depends on the shape of the clamping teeth 27. The lower portion 44' of the clamping impression 44 has an inclination so positioned that during the subsequent clamping operation of the wheel 1 an upward movement of the latter is prevented.

Figure 4:
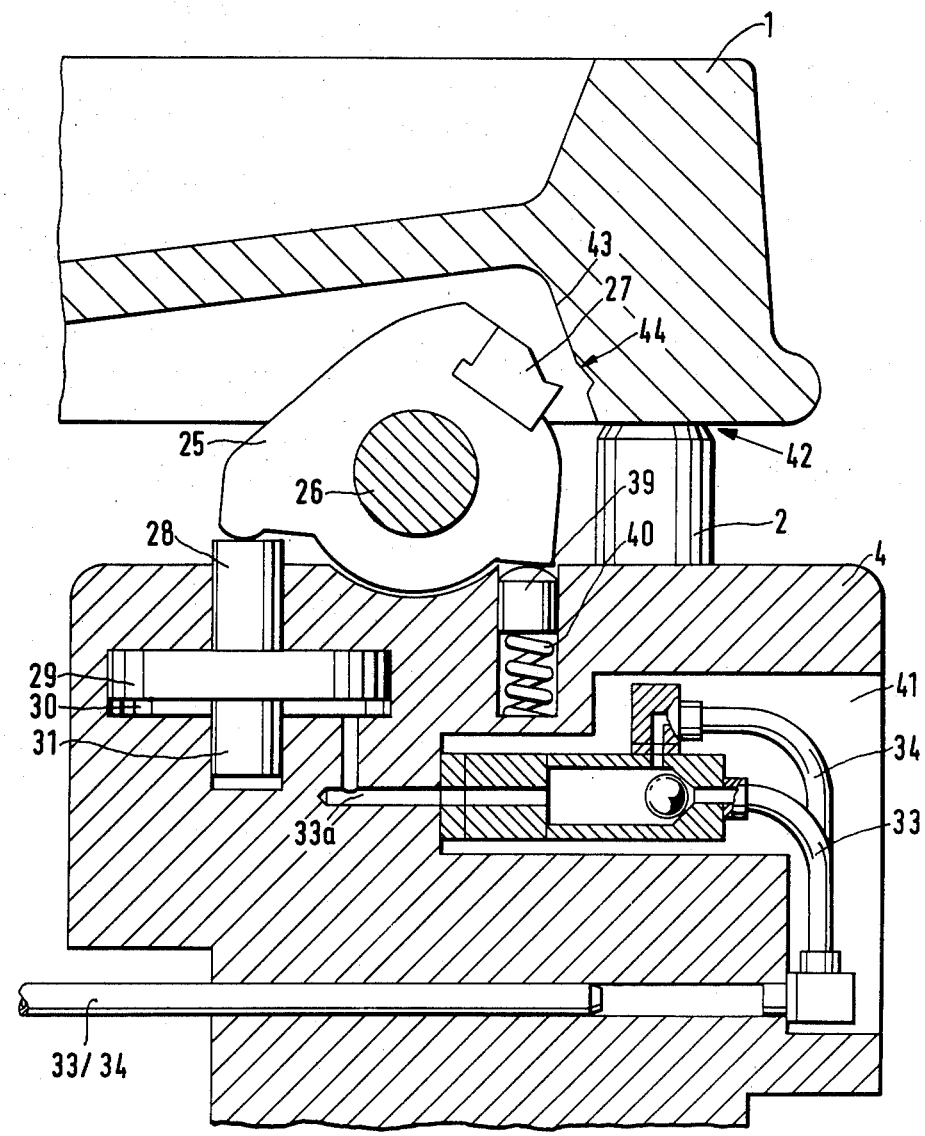
FIG. 4 shows the clamping tooth in a position ready for the clamping operation which differs from the tooth position as used for the initial penetrating.
Figure 5:
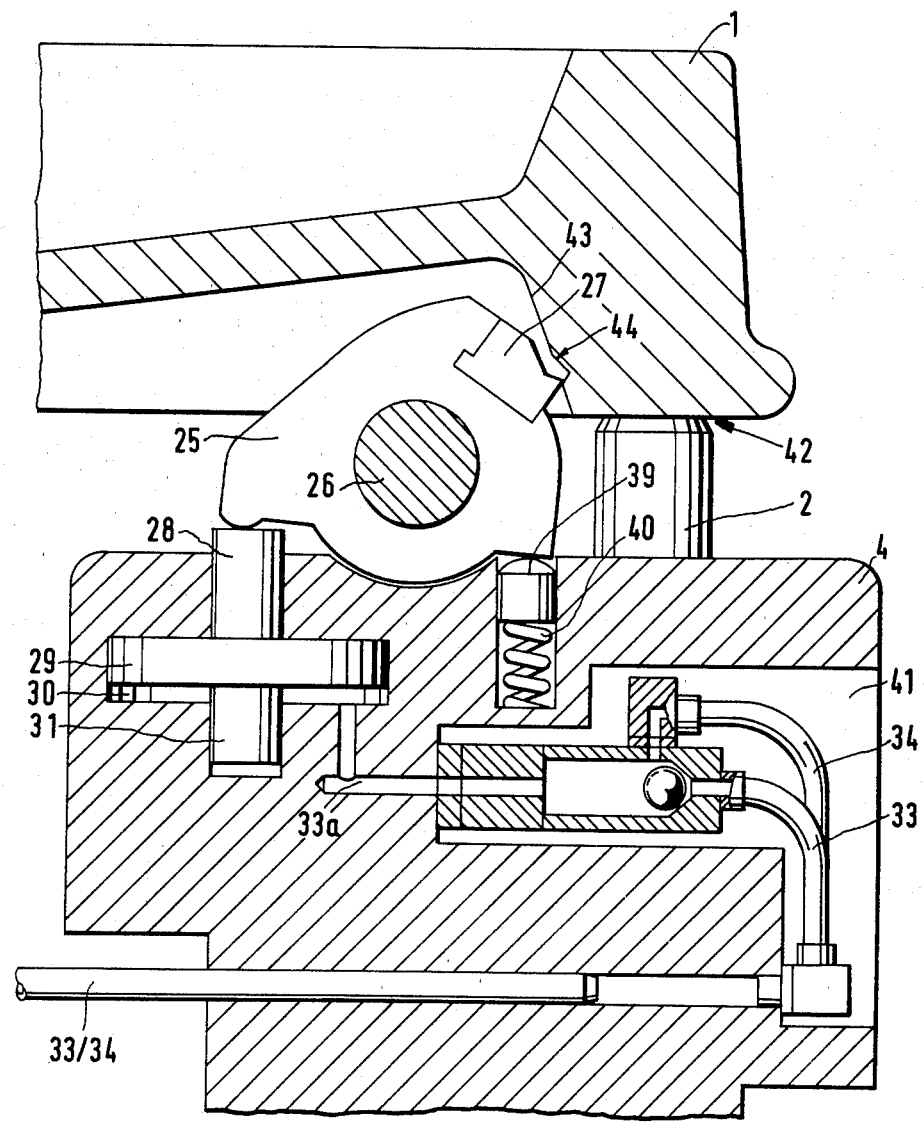
FIG. 5 shows the clamping tooth in a position ready to perform the final clamping operation.
Figure 6:
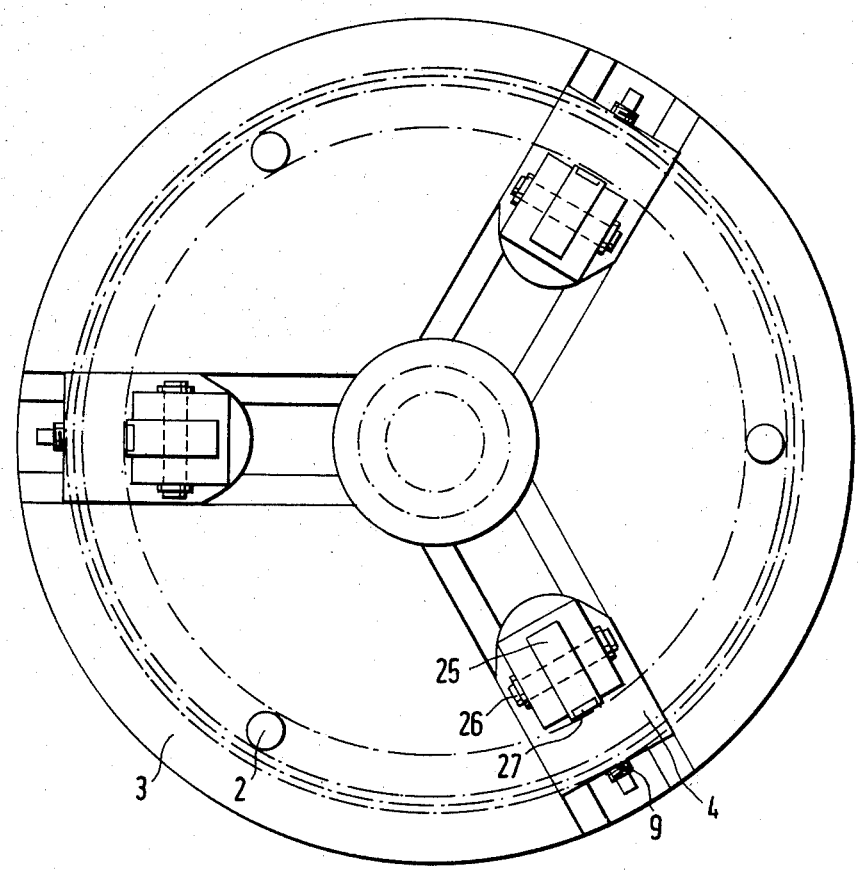
FIG. 6 illustrates a top plan view of the power clamping vice according to FIGS. 1 to 5.
Figure 7:
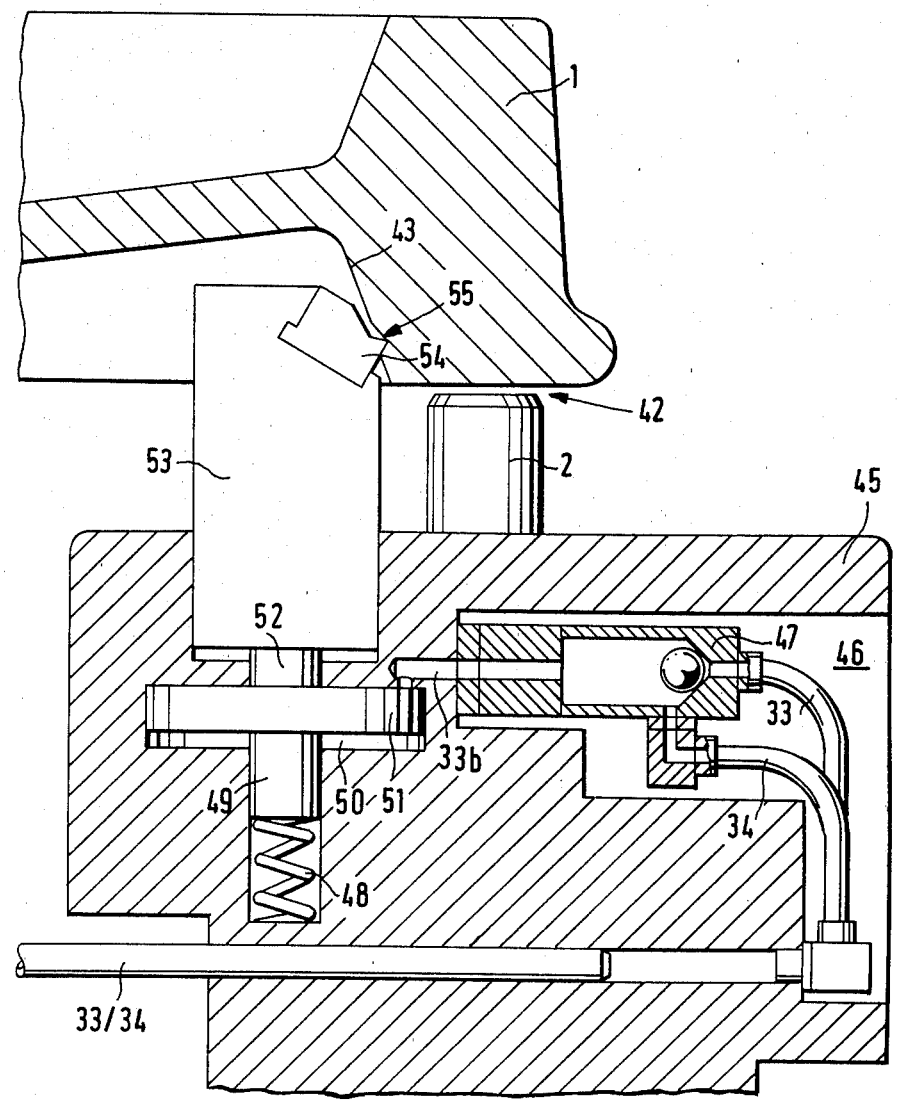
FIGS. 7, 8, 9 & 10 illustrate the same position of the clamping teeth as in FIGS. 2, 3, 4 and 5 respectively, however with regard to a modified embodiment of the apparatus according to the invention.

As shown in FIG. 4 the above advantage is utilized by bringing the toggle or rocker arm 25 and thus its respective clamping tooth 27 into the position shown in FIG. 4. Thus, the clamping tooth 27 takes up a somewhat lower position relative to its previous position. This lower position of the teeth 27 differs from the previous position by a magnitude slightly larger than the width of the gap 42. In this slightly lower position of the teeth 27 all clamping jaws 4 are again moved radially outwardly as shown in FIG. 5 to engage the work piece in a clamping contact. The clamping teeth 27 now contact the lower surface 44' of the impression 44 produced in the first clamping step, so that an upward sliding of the wheel is prevented. Thus, a safe clamping in a defined position of the railroad wheel is accomplished.

FIGS. 7 to 10 show the same sequence of working steps as FIGS. 2 to 5 however, realized by means of a structural modification of an apparatus according to the invention. In the modification of FIGS. 7 to 10 the clamping tooth 54 is not secured to a toggle or rocker lever but rather to a piston rod 53.

In the embodiment of FIGS. 7 to 10 the railroad wheel 1 is also first placed on support bolts 2 as described above with reference to FIG. 1. Thereafter the clamping jaws 45 are moved radially outwardly whereby the clamping teeth carrying piston rod 53 takes up the position shown in FIG. 7. Thus, the clamping teeth 54 come into clamping contact with the substantially inclined inwardly facing surface 43 of the wheel rim. The clamping teeth 54 penetrate into the material of the wheel rim as before and cause simultaneously an upward sliding of the entire wheel 1, whereby again a gap 42 is formed between the bolts 2 and the wheel 1.

Figure 8:
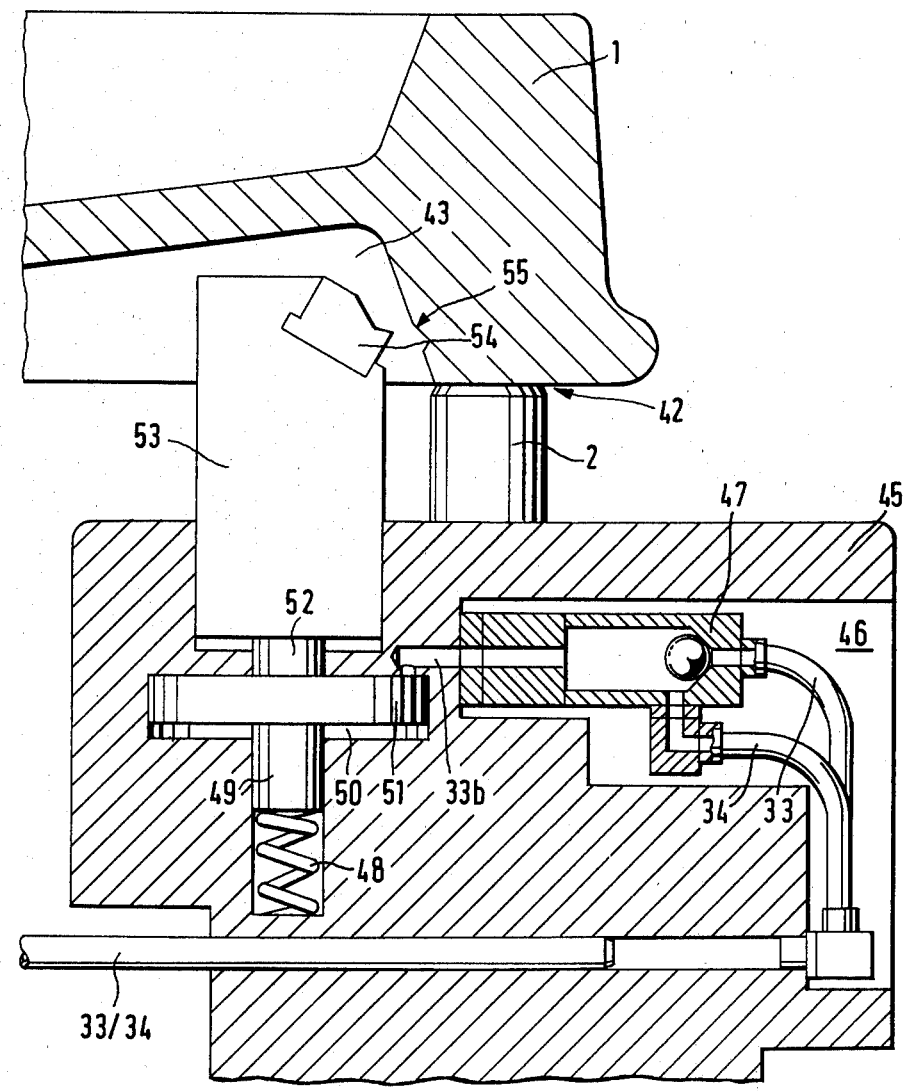
Figure 9:
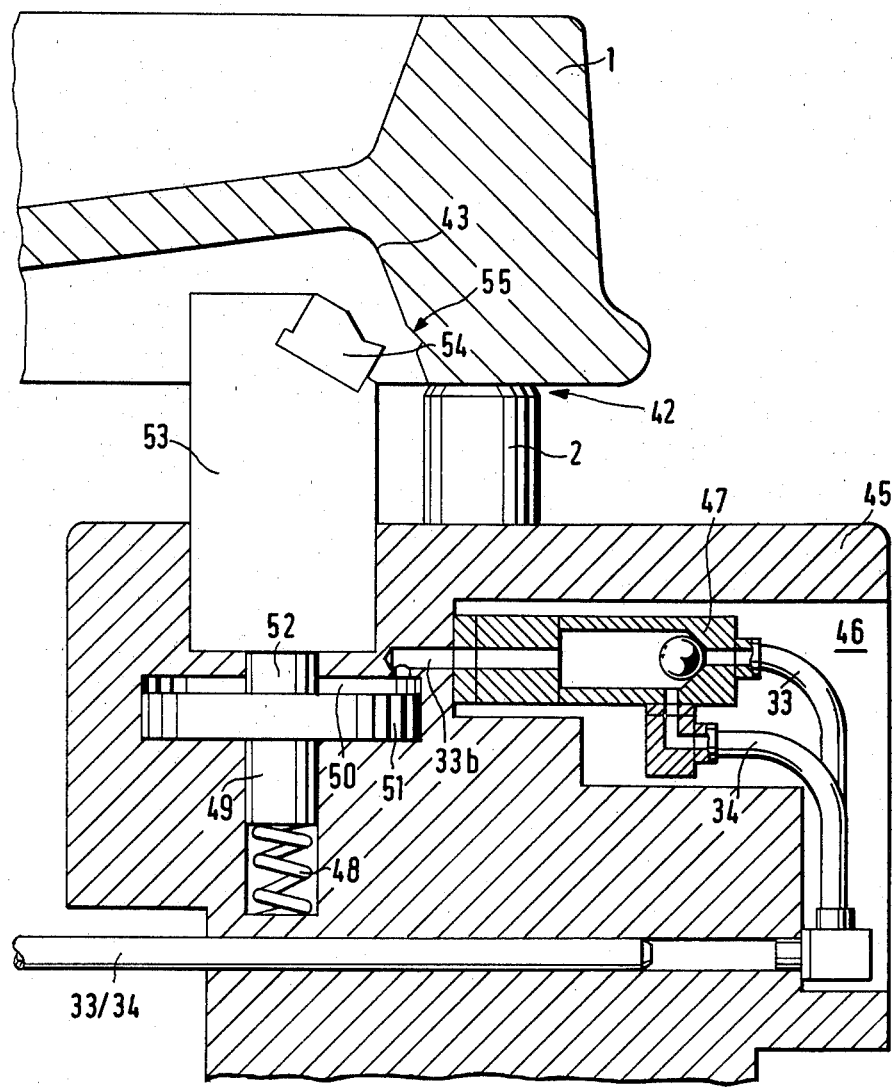
Figure 10:
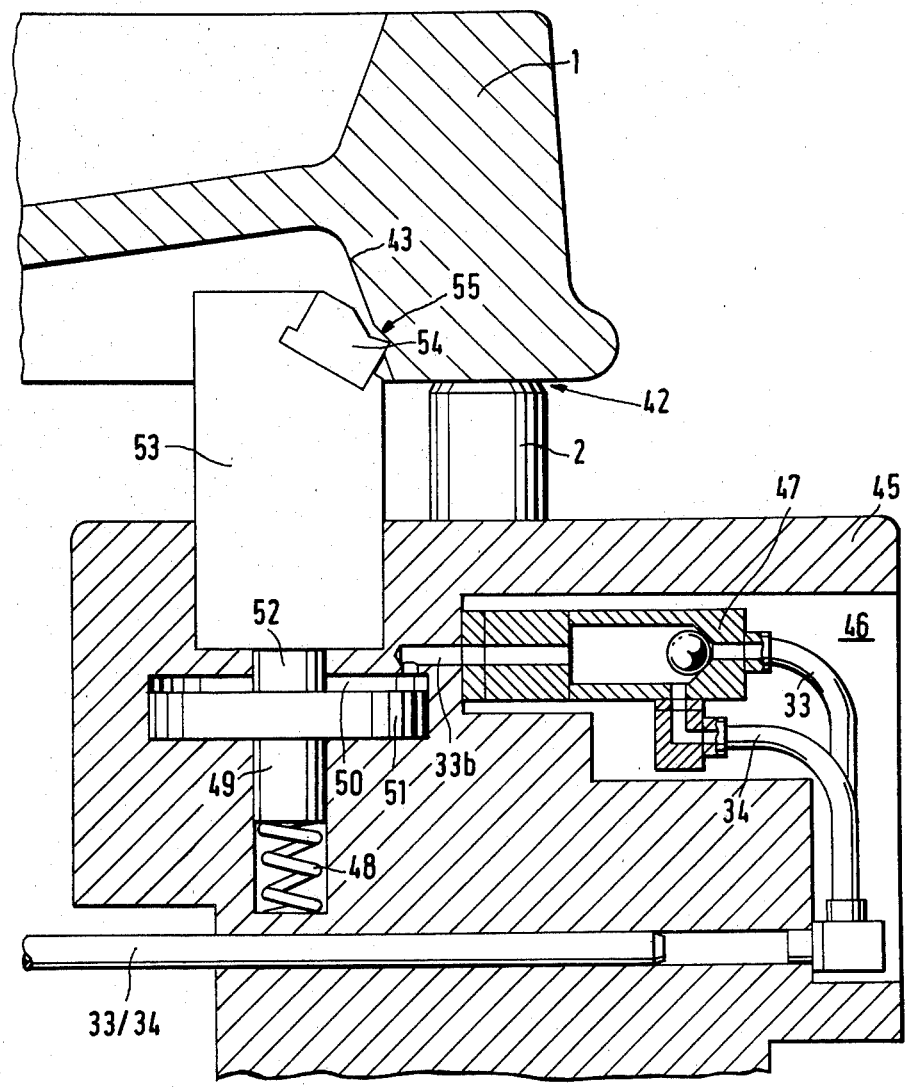
Figure 11:
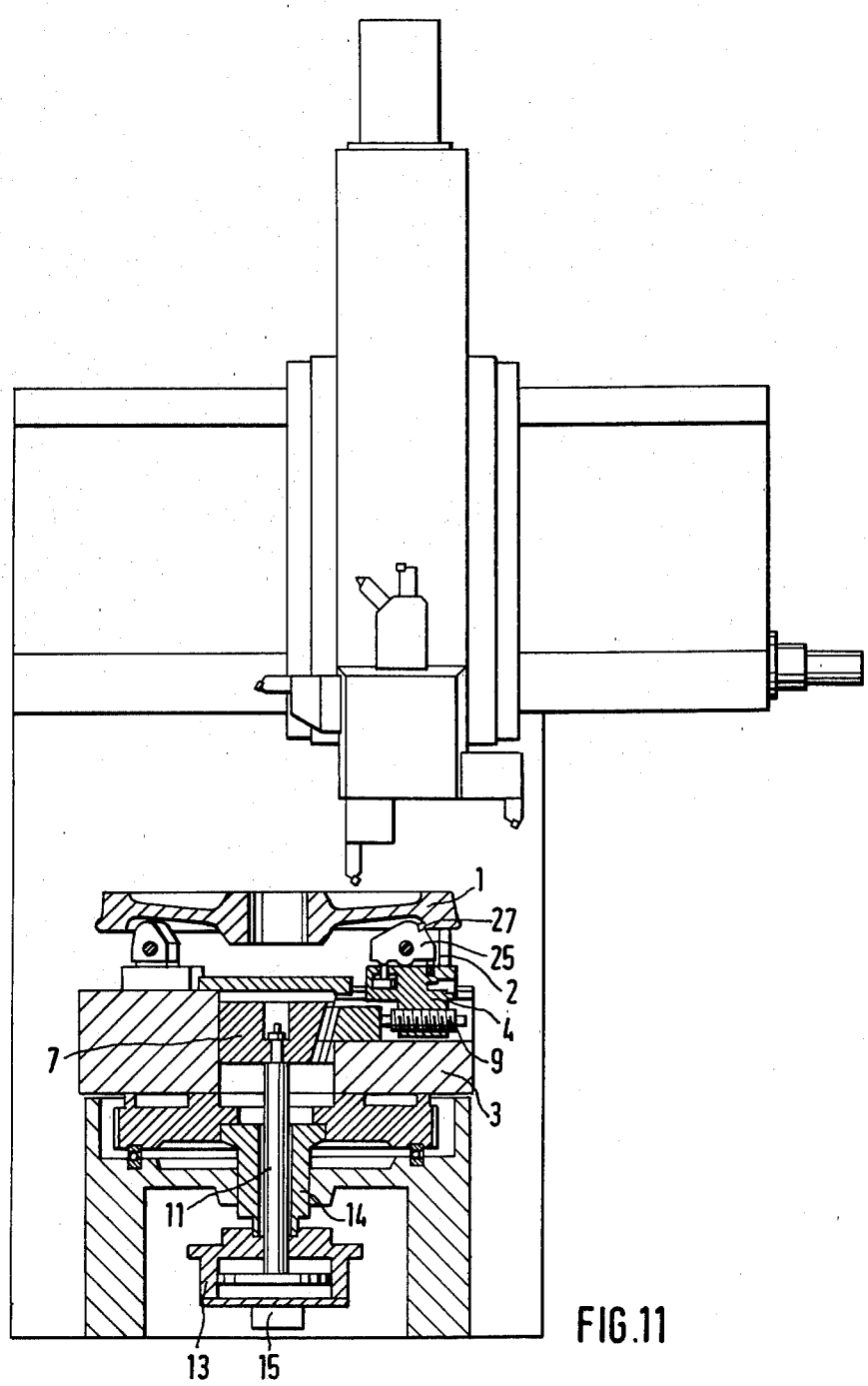
FIG. 11 shows a total elevational view partially in section along the main spindle, of a vertical turning or milling machine equipped with a power clamping vice according to the invention.

For the reasons stated above it is necessary to remove the gap 42 again and this is accomplished as shown in FIG. 8 in that the initial clamping according to FIG. 7 is released again as shown in FIG. 8 by moving the clamping jaws 45 radially inwardly, whereby the wheel 1 again takes up its position on the support bolts 2, thereby assuming an axially defined position. The clamping depressions 55 however, remain in the wheel and the shape of these depressions 55 depends on the shape of the clamping teeth 54. The lower portion 55' of the impression 55 also has an inclination which makes sure that when the wheel 1 is clamped in the second clamping operation the wheel cannot slide upwardly as is the case during the first clamping. In order to make sure that the teeth 54 can properly engage the surface 55' for the final clamping operation, the clamping tooth carrying piston rod 53 is moved downwardly as shown in FIG. 9 to an extend slightly larger than the width of the gap 42. Thus, in the final clamping operation the teeth 54 will contact the inner surface of the wheel 1 at the impression portions 55' as shown in FIG. 10. In this FIG. 10 position all clamping jaws 45 are moved radially outwardly and into clamping contact with the work piece or wheel 1. The clamping teeth 54 now only contact the lower portion 55' whereby an upward sliding of the wheel is positively prevented. This modification according to the invention thus also assures a safe clamping as well as a defined position of the railroad wheel 1 for its subsequent machining. The displacement of the clamping tooth 54 may be accomplished by the same control means that have been used for the adjustment of the tilting movement of the rocker arm 25. For this purpose each clamping jaws 45 comprise a cylinder 50 in which a piston 51 is displaceable. On the one hand the piston 51 is guided by the guide bolts 49 and on the other hand it is guided by the piston rod 52 the outer extension of which is formed as clamping tooth carrier 53. In order to move the clamping tooth carrier 53 with the tooth 54 downwardly it is necessary that oil under pressure is supplied through the conduits 33 and 33b into the cylinder 50. This oil under pressure is supplied in a known manner by the pump 20 through the conduit 21 and the pressure control valve 36 as well as through the conduit 37 to the path selector valve 35. In the position of valve 35 as shown in FIG. 1 the valve 35 supplies the oil under pressure into the conduit 33. The oil under pressure supplied to the cylinder 50 through the conduit 33 flows through the now open check valve 47 which is preferably arranged in the recess 46 of each clamping jaw 45. This openable check valve 47 has the same function as in the first embodiment, namely to avoid an unintended loosening of the clamping action, for example, when the hydraulic pressure fails.

In order to undo the downward movement of each clamping tooth 54 in preparation of a new first clamping step, it is necessary that the path selector valve 35 is brought into its second switched position so that now oil under pressure flows into the conduit 34 whereby the releasable check valve 47 is opened to thereby permit the oil return flow through the conduits 33 and 33b, through the path selector valve 35 and the conduit 38 back into the tank 24. Thus, the spring 48 which biases the guide bolt 49 operates the piston 51 into an upward position, whereby the oil flows off as described.

Both structural embodiments of the invention may be alternately used in the same type of milling machine without any modification of the control. Merely the clamping jaws are exchanged. Further, it is also possible to use both types of clamping jaws simultaneously in the same machine.

Although the invention has been described with reference to specific example embodiments, it will be appreciated, that it is intended to cover all modification and equivalents within the scope of the appended claims.

What is claimed is:

1. An apparatus for clamping a conical surface of a work piece, such as the inner rim of a railroad wheel, comprising radially movable clamping means (4), first power drive means (7, 8, 12) operatively connected to said clamping means (4) for moving the clamping means in a radial direction to exert a force on said clamping means, at least one clamping tooth means (25, 26, 27) carried by each of said radially movable clamping means for first impressing a clamping notch into a work piece with the aid of said first power drive means prior to operating said first power drive means again for a clamping operation, and second power drive means (29, 40) operatively connected to said clamping tooth means for displacing each clamping tooth means axially in a direction substantially perpendicularly to said radial movement of said clamping means, wherein said clamping tooth means comprise rocker means (25, 26), means tiltably securing said rocker means to said radially movable clamping means (4), said second power drive means comprising power operated piston cylinder tilting means (28, 29) arranged for cooperation with said rocker means (25) at one side thereof for rocking said rocker means in one direction and spring biased tilting means also arranged for cooperating with said rocker means (25) at another side thereof for rocking said rocker means in the opposite direction, said second power drive means (29, 40) being operable independently of said first power drive means (7, 8, 12) for positioning said clamping tooth means into a defined position relative to said clamping notch, whereby the engagement of the tooth means with the clamping notch during the clamping operation prevents a displacement of the work piece during the clamping operation.

2. An apparatus for clamping a conical surface of a work piece, such as the inner rim of a railroad wheel, comprising radially movable clamping means (45), first power drive means (7, 8, 12) operatively connected to said clamping means (45) for moving the clamping means in a radial direction to exert a force on said clamping means, at least one clamping tooth means (54) carried by each of said radially movable clamping means for first impressing a clamping notch into a work piece with the aid of said first power drive means prior to operating said first power drive means again for a clamping operation, and second power drive means (51) operatively arranged for displacing each clamping tooth means (54) axially in a direction substantially perpendicularly to said radial movement of said clamping means, wherein said second power drive means for said clamping tooth means comprise piston cylinder means (51) operatively secured to said radially movable clamping means, said piston cylinder means comprising piston rod means, each clamping tooth means being secured to its respective piston rod means for movement with said piston rod means in a direction extending substantially perpendicularly to the direction of movement of said radially movable clamping means, said second power drive means (51) being operable independently of said first power drive means (7, 8, 12) for positioning said clamping tooth means into a defined position relative to said clamping notch, whereby the engagement of the tooth means with the clamping notch during the clamping operation prevents a displacement of the work piece during the clamping operation.

3. The apparatus of claim 2, wherein said piston cylinder means comprise pressure medium means arranged for moving the piston in one direction and spring bias means for moving the piston in the opposite direction.

4. An apparatus for clamping a conical surface of a work piece, such as a rim of a railroad wheel, comprising clamping means (4, 45) movable in a radial direction, first power drive means (7, 8, 12) operatively connected to said clamping means (4, 45) for moving the clamping means in a radial direction to exert a force on said clamping means, at least one clamping tooth means carried by each of said radially movable clamping means for first impressing a clamping notch into a work piece with the aid of said first power drive means prior to operating said first power drive means again for a clamping operation, said apparatus further comprising second power operated adjustment drive means carried by said radially movable clamping means, said clamping tooth means being operatively connected to its respective second power operated adjustment drive means for positively moving the clamping tooth means independently of any radial movement of said clamping means caused by said first power drive means, back and forth between two end positions in a direction extending substantially perpendicularly to said radial direction, said second power drive means (51) being operable independently of said first power drive means (7, 8, 12) for positioning said clamping tooth means into a defined position relative to said clamping notch, whereby the engagement of the tooth means with the clamping notch during the clamping operation prevents a displacement of the work piece during the clamping operation, and whereby the same tooth means is operable for making said notch in a work piece in one end position and for clamping into a previously made notch in the other end position.

* * * * *

UNITED STATES PATENT AND TRADEMARK OFFICE
CERTIFICATE OF CORRECTION

PATENT NO. : 4,358,122

DATED : November 9, 1982

INVENTOR(S) : Lotha Heymanns et al.

It is certified that error appears in the above-identified patent and that said Letters Patent is hereby corrected as shown below:

ON THE TITLE PAGE, Item "(62), should read

--(62) Division of Ser. No. 51,350, Jun. 25, 1979,

Pat. No. 4,318,293. --.

Signed and Sealed this

First Day of February 1983

[SEAL]

Attest:

GERALD J. MOSSINGHOFF

Attesting Officer

Commissioner of Patents and Trademarks